US010726145B2

(12) United States Patent
Duminy et al.

(10) Patent No.: US 10,726,145 B2
(45) Date of Patent: Jul. 28, 2020

(54) METHOD TO DYNAMICALLY ELEVATE PERMISSIONS ON THE MAINFRAME

(71) Applicant: CA, INC., New York, NY (US)

(72) Inventors: Frederic Duminy, St. Charles, IL (US); Linwood Hugh Overby, Jr., Raleigh, NC (US); Kevin Cunningham, Bolingbrook, IL (US); Paul Reichl, Robbinsville, NJ (US)

( * ) Notice: Subject to any disclaimer, the term of this patent is extended or adjusted under 35 U.S.C. 154(b) by 214 days.

(21) Appl. No.: 15/891,634

(22) Filed: Feb. 8, 2018

(65) Prior Publication Data

US 2019/0243984 A1 Aug. 8, 2019

(51) Int. Cl.
*G06F 21/62* (2013.01)
*G06F 21/60* (2013.01)
*H04L 29/06* (2006.01)
*G06F 21/31* (2013.01)

(52) U.S. Cl.
CPC .......... *G06F 21/6218* (2013.01); *G06F 21/31* (2013.01); *G06F 21/604* (2013.01); *H04L 63/08* (2013.01); *H04L 63/102* (2013.01); *H04L 63/105* (2013.01); *H04L 63/108* (2013.01); *G06F 2221/2141* (2013.01)

(58) Field of Classification Search
CPC .... G06F 21/31; G06F 21/604; G06F 21/6208; G06F 2221/2141; H04L 63/08; H04L 63/102; H04L 63/108; H04N 7/17318
See application file for complete search history.

(56) References Cited

U.S. PATENT DOCUMENTS

| 2006/0143447 | A1* | 6/2006 | Vasishth | H04L 63/102 713/166 |
| 2009/0182605 | A1* | 7/2009 | Lappas | G06Q 10/06 705/34 |
| 2011/0258683 | A1* | 10/2011 | Cicchitto | G06F 21/604 726/4 |
| 2015/0222639 | A1* | 8/2015 | Dulkin | G06F 21/31 726/3 |
| 2015/0271200 | A1* | 9/2015 | Brady | H04L 63/1416 726/4 |
| 2016/0335423 | A1* | 11/2016 | Beals | H04L 12/2825 |

* cited by examiner

*Primary Examiner* — Ashokkumar B Patel
*Assistant Examiner* — William B Jones
(74) *Attorney, Agent, or Firm* — Shook, Hardy & Bacon LLP

(57) ABSTRACT

Embodiments of the present disclosure relate to automatically and dynamically elevating permissions on a mainframe system. Initially, a user may request an elevation class which corresponds to elevated class resources of the mainframe system. The elevation class may enable the user to perform actions to datasets, files, applications, or systems of the mainframe system the user may not otherwise be able to perform. If the user has permission to the elevation class, a user identification corresponding to the user and the elevation class is registered in an elevated permission structure. An access control environment element (ACEE) is dynamically created with the elevated permission structure and the elevated class resources of the elevation class are associated with the ACEE. The user can then be validated with access to the elevated class resources. At the expiration of a limited duration of time, the elevated class resources are automatically disassociated with the ACEE.

18 Claims, 3 Drawing Sheets

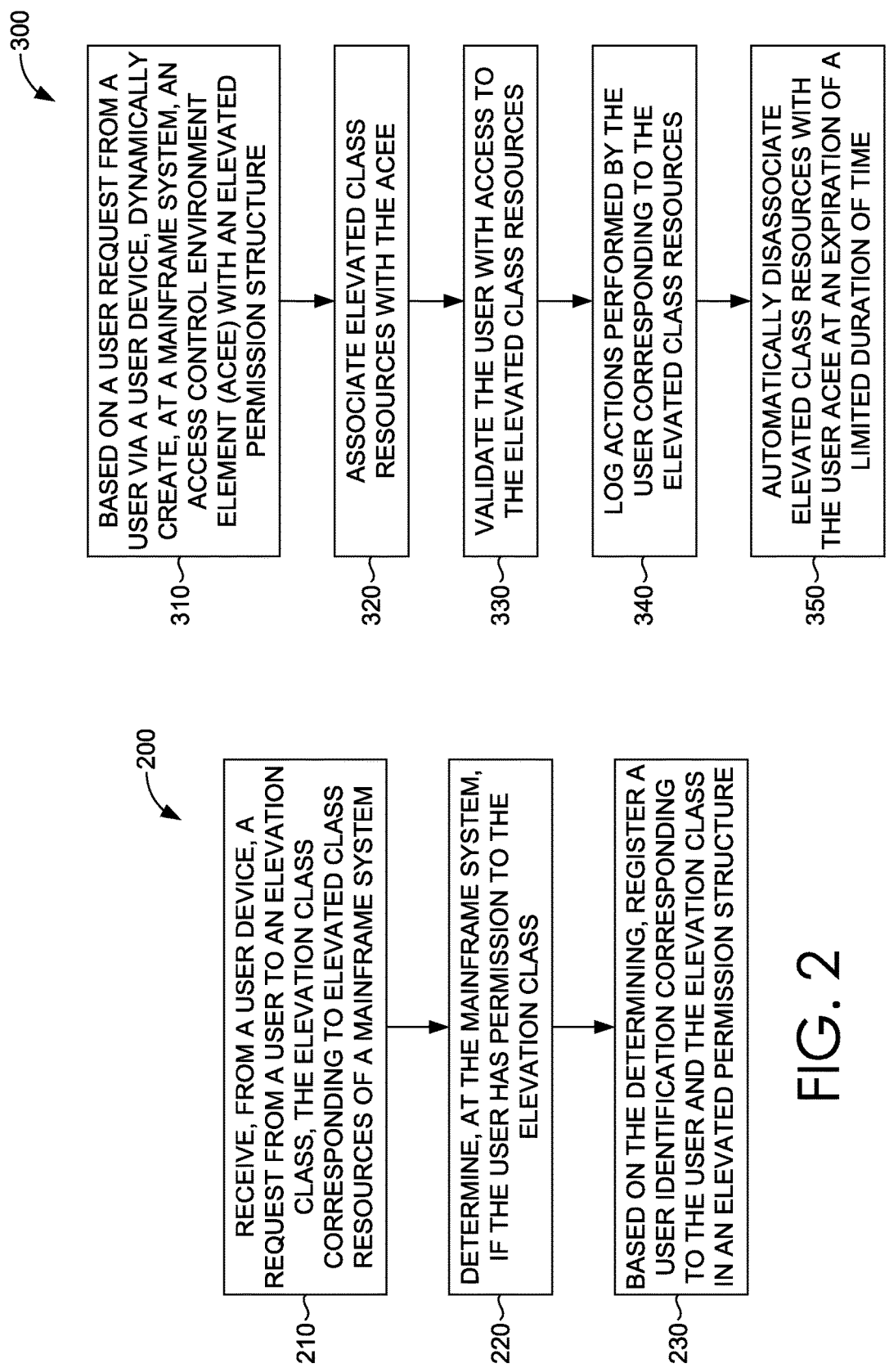

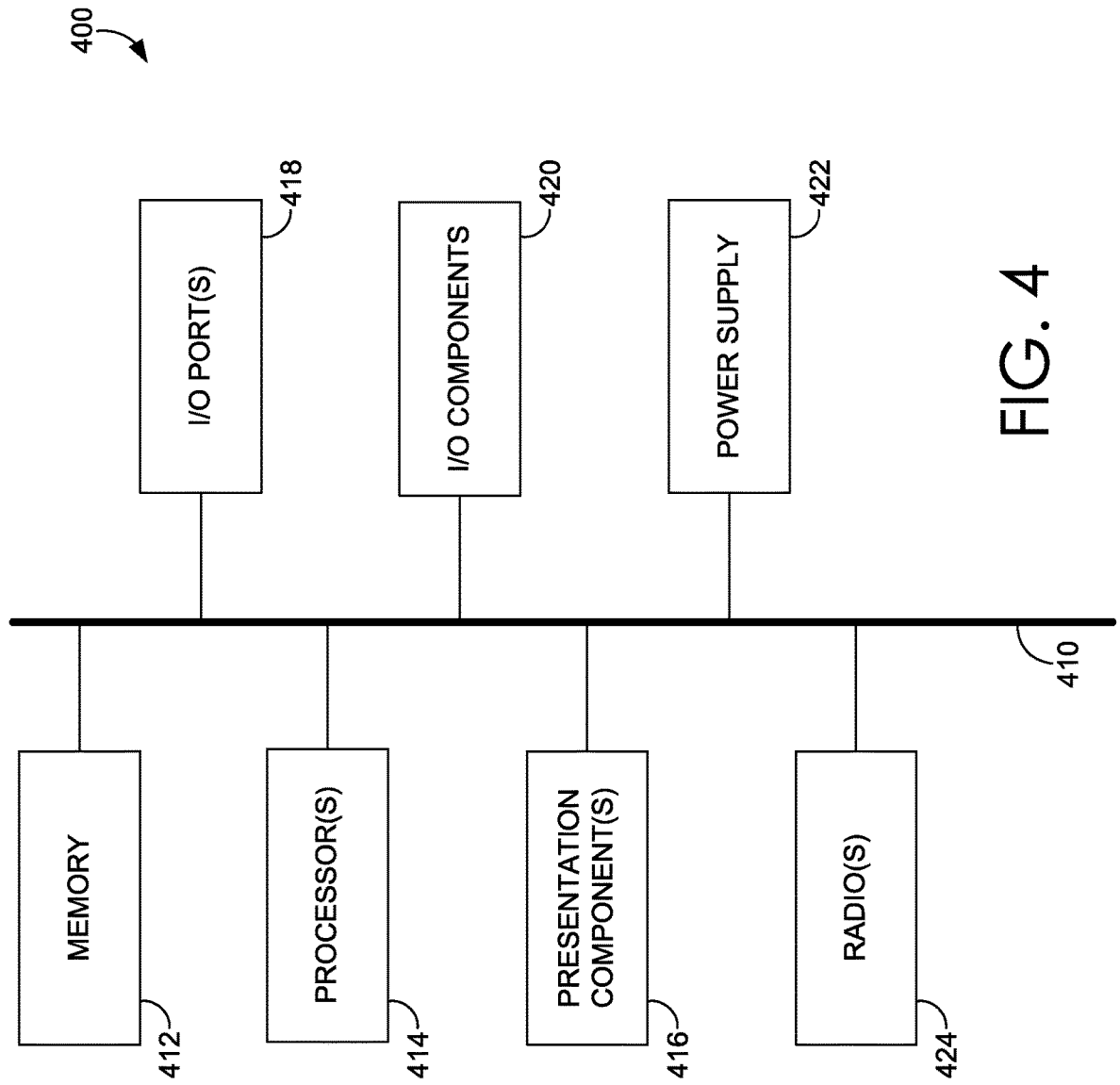

METHOD TO DYNAMICALLY ELEVATE PERMISSIONS ON THE MAINFRAME

BACKGROUND

Mainframe systems provide powerful and useful tools for many tasks. However, security considerations often prevent users from performing particular actions. In some instances, such as during off-hours or on a limited basis, users may need additional access to perform these actions. In conventional mainframe systems, users needing additional access may access a trouble ticket system to request such access. The trouble ticket is typically routed to a security administrator and, if the security administrator is willing to provide the additional access, it is up to the security administrator to manually grant the access. After granting the access, the security administrator closes the trouble ticket and lets the user know the access has been granted. Once the user no longer needs the additional access, the security administrator must manually remove the access. This process can be time-intensive (e.g., if a security administrator is not available or due to delays in the trouble ticket system routing) and/or labor-intensive (e.g., trouble ticket system and manual processes).

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to mainframe systems. More particularly, embodiments of the present disclosure relate to automatically and dynamically elevating permissions on a mainframe system. Initially, a user may request an elevation class which corresponds to elevated class resources of the mainframe system. The elevation class may enable the user to perform actions to datasets, files, applications, or systems of the mainframe system the user may not otherwise be able to perform. If the user has permission to the elevation class, a user identification corresponding to the user and the elevation class is registered in an elevated permission structure. An access control environment element (ACEE) is dynamically created with the elevated permission structure and the elevated class resources of the elevation class are associated with the ACEE. The user can then be validated with access to the elevated class resources. In some embodiments, actions performed by the user corresponding to the elevated class resources are logged. At the expiration of a limited duration of time (which may be set by a security administrator), the elevated class resources are automatically disassociated with the ACEE. In some embodiments, if some of the elevated class resources are not available for access, the user can be revalidated with access to the available elevated class resources.

BRIEF DESCRIPTION OF THE DRAWINGS

The present invention is described in detail below with reference to the attached drawing figures, wherein:

FIG. 2 is a flow diagram showing a method of validating a user with access to elevated class resources, in accordance with embodiments of the present disclosure;

FIG. 3 is a flow diagram showing a method of logging actions performed by a user with access to elevated class resources, in accordance with embodiments of the present disclosure; and FIG. 4 is a block diagram of an exemplary computing environment suitable for use in implementing embodiments of the present disclosure.

DETAILED DESCRIPTION

Figure 1:
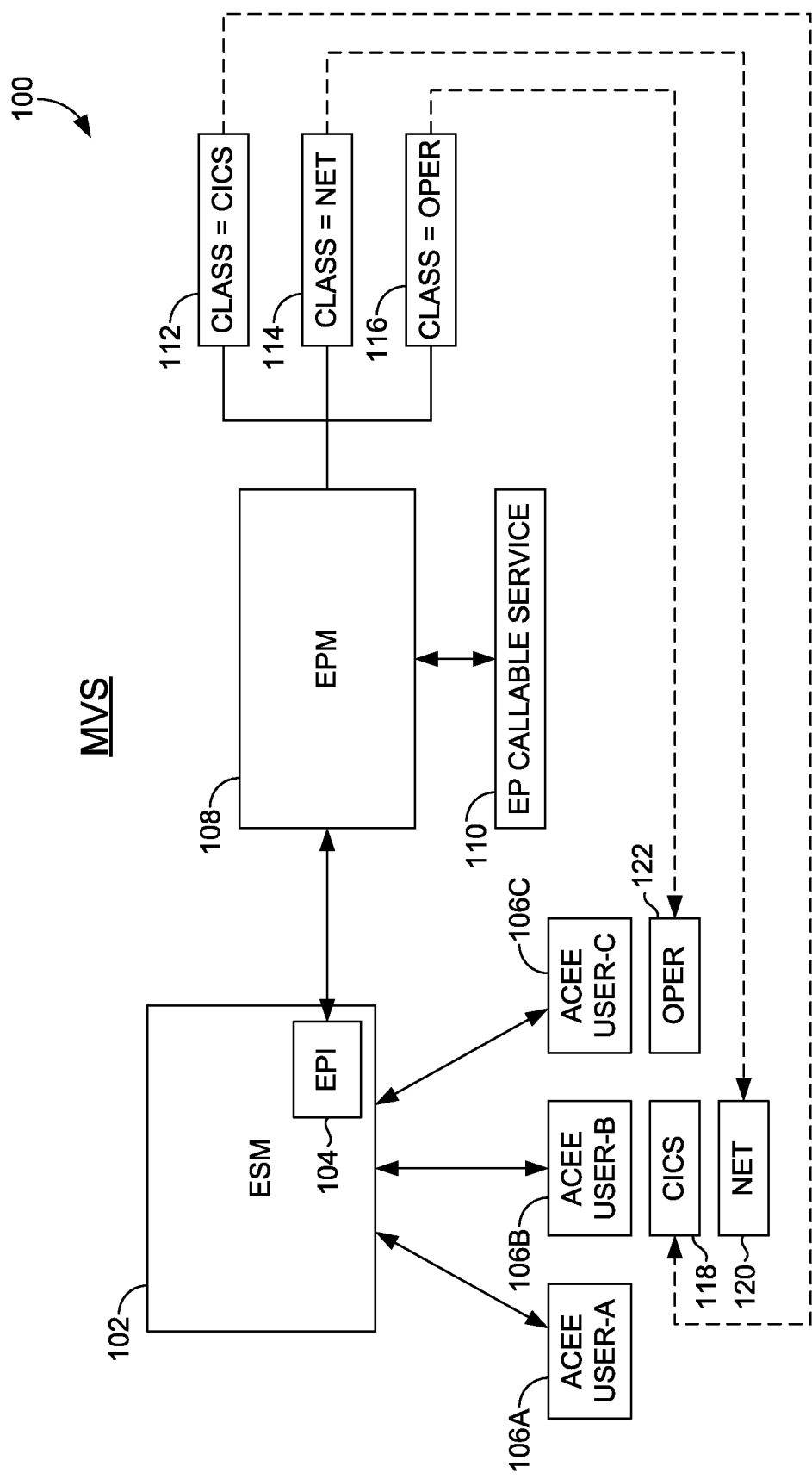
FIG. 1 is a block diagram showing a system that dynamically elevates permissions on a mainframe system, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

As noted in the background, mainframe systems provide powerful and useful tools for many tasks. Users are typically assigned varying permissions that may be based on roles, seniority, or other factors. These security considerations may prevent users from performing particular actions. However, there may be situations where a particular user needs elevated permission to perform such actions. For example, during off-hours or on a limited basis, it may be prudent to provide the user additional access to avoid escalating a task up the chain when the user may be capable of performing an action corresponding to the task on a one-time or emergency basis. In conventional mainframe systems, the user creates a trouble ticket via a trouble ticket system to request elevated permissions. The trouble ticket may be routed to a security administrator and, if the security administrator is willing to provide the additional access, the security administrator manually grants the access. After granting the access, the security administrator closes the trouble ticket and lets the user know the access has been granted. Once the user no longer needs the additional access, the security administrator must manually remove the access. This process can be time-intensive (e.g., if a security administrator is not available or due to delays in the trouble ticket system routing) and/or labor-intensive (e.g., requires use of the trouble ticket system and manual processes performed by the security administrator).

Embodiments of the present disclosure relate to mainframe systems. More particularly, embodiments of the present disclosure relate to automatically and dynamically elevating permissions on a mainframe system. Initially, a user may request an elevation class which corresponds to elevated class resources of the mainframe system. The elevation class may enable the user to perform actions to datasets, files, applications, or systems of the mainframe system the user may not otherwise be able to perform. If the user has permission to the elevation class, a user identification corresponding to the user and the elevation class is registered in an elevated permission structure. An access control environment element (ACEE) is dynamically created with the elevated permission structure and the elevated class resources of the elevation class are associated with the ACEE. The user can then be validated with access to the elevated class resources.

In some embodiments, actions performed by the user corresponding to the elevated class resources are logged. At the expiration of a limited duration of time (which may be set by a security administrator), the elevated class resources are automatically disassociated with the ACEE. In some embodiments, if some of the elevated class resources are not available for access, the user can be revalidated with access to the available elevated class resources.

A security administrator may initially set up elevated permissions or resources. If a user needs the elevated permissions or resources, the user can effectively check out the elevated permissions or resources. If the user is validated (i.e., preauthorized to check out the particular elevated permissions or resources), the user has access to the elevated permissions or resources.

In practice, a user may determine there is a failure in a production system, job, or process during off-hours (e.g., 2:00 am). Since a security administrator or someone able to grant the user any necessary permissions or access to resources may be unavailable, the user may request an elevation class which allows the user to check out elevated permissions or resources so the user can have access to the data sets or files that the user does not normally have on a day-to-day basis. This enables the user to gain the appropriate access to the datasets, files, applications, or systems to troubleshoot the failure. For security, the elevated permissions are time-boxed (i.e., limited in time). Additionally, based on how the elevated permissions or resources are set up by the security administrator, all or parts of the activities performed by the user corresponding to the elevated permissions or resources may be logged.

Accordingly, one embodiment of the present disclosure is directed to a method. The method comprises receiving, from a user device, a request from a user to an elevation class. The elevation class corresponds to elevated class resources of a mainframe system. The method also comprises determining, at the mainframe system, if the user has permission to the elevation class. The method further comprises, based on the determining, registering a user identification corresponding to the user and the elevation class in an elevated permission structure. The method also comprises dynamically creating an access control environment element (ACEE) with the elevated permission structure. The method further comprises associating the elevated class resources of the elevation class with the ACEE. The method also comprises validating the user with access to the elevated class resources.

In another embodiment, the present disclosure is directed to a computer storage medium storing computer-useable instructions that, when used by at least one computing device, cause the at least one computing device to perform operations. The operations comprise, based on a user request from a user via a user device, dynamically creating, at a mainframe system, an access control environment element (ACEE) with an elevated permission structure. The operations also comprise associating elevated class resources with the ACEE. The operations further comprise validating the user with access to the elevated class resources. The operations also comprise logging actions performed by the user corresponding to the elevated class resources.

In yet another embodiment, the present disclosure is directed to a computerized system. The system includes a processor and a computer storage medium storing computer-useable instructions that, when used by the processor, cause the processor to receive, from a user device, a request from a user to an elevation class, the elevation class corresponding to elevated class resources of a mainframe system. It is determined, at the mainframe system, if the user has permission to the elevation class. Based on the determining, a user identification corresponding to the user and the elevation class is registered in an elevated permission structure. An access control environment element (ACEE) is dynamically created with the elevated permission structure.

Referring now to FIG. 1, a block diagram is provided that illustrates a permissions elevation system 100 that enables permissions to be automatically and dynamically elevated on a mainframe system, in accordance with an embodiment of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The permissions elevation system 100 may be implemented via any type of computing device, such as computing device 400 described below with reference to FIG. 4, for example. In various embodiments, the permissions elevation system 100 may be implemented via a single device or multiple devices cooperating in a distributed environment.

The permissions elevation system 100 generally operates to elevate permissions automatically and dynamically on a mainframe system. As shown in FIG. 1, the permissions elevation system 100 is part of a mainframe environment and includes, among other components, in Multiple Virtual Storage (MVS) address space, an external security manager (ESM) 102, an elevated permission ESM integrator (EPI) 104, an access control environment element(s) (ACEEs) 106A, 106B, 106C, an elevated permission manager (EPM) 108, an elevated permission (EP) callable service 110, and elevated classes 112, 114, 116. It should be understood that the elevated permissions system 100 shown in FIG. 1 is an example of one suitable computing system architecture. Each of the components shown in FIG. 1 may be implemented via any type of computing device, such as computing device 400 described with reference to FIG. 4, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of ESMs, EPIs, ACEEs, EPMs, EP callable services, and elevated classes may be employed by the elevated permissions system 100 within the scope of the present disclosure. Each may comprise a single device or multiple devices cooperating in a distributed environment. For instance, the elevated permissions system 100 may be provided via multiple devices arranged in a distributed environment that collectively provide the functionality described herein. Additionally, other components not shown may also be included within the network environment.

An external security manager (ESM) 102 generally provides security to the mainframe. Examples of ESMs include TOP SECRET, ACF2, AND RACF. As described herein, ESM 102 is able to dynamically provide access to additional secured resources to a user without involving a security administrator. The ESM 102 also creates a user ACEE.

In embodiments, the ESM 102 may receive security calls (e.g., from the operating system or a product) for a particular resource. The security call is associated with a user ACEE (i.e., a security object for the user to be validated). THE ESM 102 validates whether the user corresponding to the user ACEE has access to the particular resource. For example, suppose there is a file that a user does not have access to on a normal basis. When the user attempts to access that file, a security call is issued to the ESM 102. The ESM analyzes the ACEE of the user making the attempt to see if the user has permission to access the file. If there is no permission to the file, the ESM 102 issues a fail response to the operating system or product making the security call. In response, the operating system or product performs any actions necessary to deny the user access to the file.

If on the other hand, the user has permission to access the file, the ACEE contains the permission to access the file. This time, the ESM 102 will analyze the ACEE and determine the user has permission to access the file and will issue the appropriate response to the operating system or product. Accordingly, the operating system or product will allow the user to access the file. In some embodiments, the ESM 102 logs any access by the user to the file. Alternatively, the ESM 102 may only log elevated access, as described in detail below, by the user to the file.

An elevated permission ESM integrator (EPI) 104 generally checks and provides the information that is included in ACEEs. To do so, the EPI 104 receives definitions and characteristics for permissions, as well as elevated permissions, from the EPM 108. Upon a user login or a refresh command being issued, the EPI 104 communicates with the EPM 108 to determine definitions and characteristics for normal and any elevated permissions for the user. At user ACEE creation, the EPI 104 provides the corresponding definitions and characteristics to the ESM 102. Upon receiving the definitions and characteristics, along with the maintained structure, the ESM 102 appends the elevated permissions directly to the user ACEE.

Since the elevated permissions have already been validated for the user, there is no back-end processing. Instead, the elevated permissions are dynamically added to the user ACEE as if they had been added to the security database by the security administrator. This provides more efficient processing (since the elevated permissions are appended to the ACEE, the elevated permissions do not have to be checked on the back-end after an initial access failure). Additionally, since the elevated permissions are time-boxed (limited in time as set by a security administrator during setup of each elevated class), overall security is improved since the security administrator does not have to remember to remove elevated permissions. Rather, once the time limit has been reached, the elevated permissions are automatically and dynamically removed from the user ACEE and the user no longer has access.

As described, an access control environment element(s) (ACEEs) 106A, 106B, 106C is a security object for a user. Each ACEE created by the ESM 102 includes definitions and characteristics that are checked by the EPI 104 during user login or upon a refresh command being issued. The ACEE may include normal, day-to-day permissions for the user. Of, if the user has requested elevated permissions and been validated, the ACEE may include the definitions and characteristics corresponding to the elevated permissions. In embodiments, updates (e.g., elevated permissions) to the ACEE are made during ACEE creation at user login. Alternatively, updates to the ACEE are made dynamically, such as when a user issues a refresh command.

An elevated permission manager (EPM) 108 generally acts as a lockbox that includes definitions and characteristics for users corresponding to elevated classes 112, 114, 116. The elevated classes 112, 114, 116 may be defined by a security administrator and provide various levels of temporary, elevated access to datasets, files, applications, or systems of the mainframe system, without administrative delay. For example, some elevated classes may provide access to files that are associated with network processes. Other elevated classes may provide permissions associated with administration of resources for sub-systems or major components, such as transaction processing regions. As can be appreciated, the elevated classes may be defined as broadly or as granular as desired. The elevated classes 112, 114, 116 may further define users that have permission to various elevated access.

An elevated permission (EP) callable service 110 generally enables a user to request access to an elevation class. Initially, the EP callable service 110 may check if the user has permission to the elevation class. If the user has permission to the elevation class, the EPM 108 registers the user identification (ID) and the elevated class, which is checked by the EPI 104 at user login or upon a refresh command being issued.

In practice, and as illustrated by FIG. 1, the security administrator may initially create elevated classes. The elevated classes may include a CICS class, a NET class, and an OPER class. Each of these classes are maintained by the EPM 108. As described, each of the classes may additionally define users that have permission to the elevation class.

When a user needs elevated access, the user accesses the EP callable service 110 and checks out the desired elevation class. If the user is validated, meaning the user has permission to a particular elevation class, the EPM 108 registers the user ID and the elevated class. This enables the user to access whatever resources are provided by the elevated class the next time the user ACEE is built for the user.

Assuming the user logs in to the ESM 102 or issues a refresh command, the ESM 102 receives the definitions and characteristics (i.e., normal day-to-day definitions and characteristics and elevated definitions and characteristics) that define the security access for that particular user. The ESM 102 builds the user ACEE, which includes any elevated permissions, and the user has automatic and dynamic access to the resources corresponding to the elevated class.

Additionally, the ESM 102 may log any actions performed by the user generally, or specifically to resources corresponding to the elevated class. Once the time limit runs out, which was predefined during the elevated class setup, the elevated permissions are automatically and dynamically removed from the user ACEE and the user no longer has access to the resources corresponding to the elevated class.

As shown in FIG. 1, each of the ACEEs have various degrees of access. For example, user A corresponding to ACEE 106a has normal day-to-day access. In other words, user A has not requested elevated access via the EP callable service 110 for any elevation classes (or user A may have requested elevated access but was not validated). User B corresponding to ACEE 106b has requested access to a CICS class 112 and a NET class 114 and been validated for both. As shown, CICS permissions 118 and NET permissions 120 have been appended to ACEE 106b. Similarly, user C corresponding to ACEE 106c has requested access to a OPER class 116 and has successfully been validated. Accordingly, OPER permissions 122 have been appended to ACEE 106c.

Turning now to FIG. 2, a flow diagram is provided that illustrates a method 200 of validating a user with access to elevated class resources, in accordance with embodiments of the present disclosure. For instance, the method 200 may be employed utilizing the permissions elevation system 100 of FIG. 1. As shown at step 210, a request is received, from a user via a user device, to an elevation class. Importantly, the request is received without the user submitting a request to a security administrator. For example, the request may be received at an elevated permission manager of the mainframe system via a callable service. In some embodiments the request is received during off-hours. The request may be for a limited duration of time and may be selected or specified by the user.

As mentioned, a request is received from a user to an elevation class. The elevation class corresponds to elevated class resources of a mainframe system. The elevation class may be created by an administrator to provide temporary access to specified elevated class resources. The elevated class resources enable the user to perform actions to datasets, files, applications, or systems corresponding to the elevation class. At step 220, it is determined, at the mainframe system, if the user has permission to the elevation class.

Based on the determining, a user identification corresponding to the user and the elevation class is registered, at step 230, in an elevated permission structure. In some embodiments, during user authentication, an access control environment element (ACEE) is dynamically created with the elevated permission structure. Alternatively, upon the user issuing a refresh command, the access control environment element (ACEE) may be dynamically created with the elevated permission structure.

In FIG. 3, a flow diagram is provided that illustrates a method 300 of logging actions performed by a user with access to elevated class resources, in accordance with embodiments of the present disclosure. For instance, the method 300 may be employed utilizing the permissions elevation system 100 of FIG. 1. As described above and as shown at step 310, based on a user request from a user via a user device, an access control environment element (ACEE), with an elevated permission structure, is dynamically created at a mainframe system.

At step 320, elevated class resources are associated with the ACEE. The elevated class resources enable the user to perform actions to datasets, files, applications, or systems corresponding to the elevation class. Temporary access to specified elevated class resources may be provided by administrator-created elevation classes.

The user is validated, at step 330, with access to the elevated class resources. In some embodiments, some of the elevated class resources may not available for the user to access. Accordingly, the user may be revalidated with access to the available elevated class resources. For example, such resources may include devices that contain files that have been varied offline for maintenance or applications such as CICS which have been made unavailable due to outages. The outages may be related to application or system failures or to applying application maintenance. When the resources become available, normal validation including elevated permission checking may then be performed.

For security purposes, actions performed by the user corresponding to the elevated class resources may be logged, at step 340. At the expiration of a limited duration of time, the elevated class resources are automatically disassociated, at step 350, with the user ACEE. In various embodiments, the limited duration of time may be set by the security administrator or requested by the user. If requested by the user, it may be determined if the user has permission for the requested duration of time at the same time it is determined whether the user has permission to the elevation class.

Having described embodiments of the present disclosure, an exemplary operating environment in which embodiments of the present disclosure may be implemented is described below in order to provide a general context for various aspects of the present disclosure. Referring to FIG. 4 in particular, an exemplary operating environment for implementing embodiments of the present disclosure is shown and designated generally as computing device 400. Computing device 400 is but one example of a suitable computing environment and is not intended to suggest any limitation as to the scope of use or functionality of the inventive embodiments. Neither should the computing device 400 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output (I/O) ports 418, input/output (I/O) components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as stereoscopic camera systems, infrared camera systems, RGB camera systems, and combinations of these, for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

As can be understood, embodiments of the present disclosure provide for an objective approach for enabling a JVM to process a data object in common storage. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
   receiving, from a user device, a request from a user to an elevation class, the elevation class corresponding to elevated class resources of a mainframe system, wherein the receiving enables the request to bypass an administrator;
   determining, at the mainframe system, if the user has permission to the elevation class;
   based on the determining, registering a user identification corresponding to the user and the elevation class in an elevated permission structure;
   dynamically creating an access control environment element (ACEE) with the elevated permission structure;
   associating the elevated class resources of the elevation class with the ACEE;
   validating the user with access to the elevated class resources; and
   automatically disassociating the elevated class resources with the ACEE at an expiration of a limited duration of time, wherein the limited duration of time was requested by the user.

2. The method of claim 1, wherein the elevated class resources enable the user to perform actions to datasets, files, applications, or systems corresponding to the elevation class.

3. The method of claim 1, further comprising logging actions performed by the user corresponding to the elevated class resources.

4. The method of claim 1, further comprising:
   determining each of the elevated class resources is not available for access; and
   revalidating the user with access to available elevated class resources.

5. The method of claim 1, wherein the ACEE is dynamically created with the elevated permission structure during user authentication.

6. The method of claim 1, wherein the ACEE is dynamically created with the elevated permission structure upon the user issuing a refresh command.

7. The method of claim 1, wherein the request is received at an elevated permission manager of the mainframe system via a callable service.

8. The method of claim 1, wherein the elevation class is created by the administrator and provides temporary access to specified elevated class resources.

9. The method of claim 1, wherein the request is received during off-hours.

10. The method of claim 1, wherein the elevated class resources provide access to files associated with network processes and provide permissions associated with administration of resources for transaction processing regions.

11. A non-transitory computer storage medium storing computer-useable instructions that, when used by at least one computing device, cause the at least one computing device to perform operations comprising:

based on a user request from a user via a user device, dynamically creating, at a mainframe system, an access control environment element (ACEE) with an elevated permission structure;

associating elevated class resources with the ACEE;

validating, at an external security manager device that bypasses an administrator, the user with access to the elevated class resources; and automatically disassociating the elevated class resources with the ACEE at an expiration of a limited duration of time, wherein the limited duration of time was requested by the user.

12. The computer storage medium of claim 11, further comprising receiving, from the user device, the user request from the user to an elevation class, the elevation class corresponding to the elevated class resources of the mainframe system.

13. The computer storage medium of claim 12, further comprising determining, at the mainframe system, if the user has permission to the elevation class.

14. The computer storage medium of claim 13, further comprising based on the determining, registering a user identification corresponding to the user and the elevation class in the elevated permission structure.

15. The computer storage medium of claim 11, further comprising logging actions performed by the user corresponding to the elevated class resources.

16. A computerized system comprising:

a processor; and a computer storage medium storing computer-useable instructions that, when used by the processor, cause the processor to:

receive, from a user device, a request from a user to an elevation class, the elevation class corresponding to elevated class resources of a mainframe system, wherein the request bypasses an administrator;

determine, at the mainframe system, if the user has permission to the elevation class;

based on the determining, register a user identification corresponding to the user and the elevation class in an elevated permission structure;

dynamically create an access control environment element (ACEE) with the elevated permission structure; and automatically disassociating the elevated class resources with the ACEE at an expiration of a limited duration of time, wherein the limited duration of time was requested by the user.

17. The computerized system of claim 16, further comprising associating the elevated class resources with the ACEE.

18. The computerized system of claim 17, further comprising validating the user with access to the elevated class resources.

* * * * *